United States Patent [19]

Huggins et al.

[11] Patent Number: 4,927,313
[45] Date of Patent: May 22, 1990

[54] NUCLEAR FUEL PELLET SINTERING BOAT UNLOADING APPARATUS AND METHOD

[75] Inventors: Thomas B. Huggins, Columbia; Wade H. Widener, Cayce; Kenneth K. Klapper, West Columbia, all of S.C.

[73] Assignee: Westinghouse Electric Corp., Pittsburgh, Pa.

[21] Appl. No.: 313,128

[22] Filed: Feb. 21, 1989

[51] Int. Cl.$^5$ .................. B65B 21/22; B65G 65/23
[52] U.S. Cl. .................. 414/414; 414/146; 414/404; 414/421; 414/786
[58] Field of Search ............... 414/146, 404, 408, 414, 414/419, 421

[56] References Cited

U.S. PATENT DOCUMENTS

| | | | |
|---|---|---|---|
| 1,776,034 | 9/1930 | Krahn | 414/421 X |
| 1,906,126 | 4/1933 | Mott | 414/414 |
| 2,344,664 | 5/1944 | Adams | 214/1.1 |
| 2,577,091 | 12/1951 | Porter | 214/1.1 |
| 2,702,138 | 2/1955 | Getty | 414/421 X |
| 2,781,929 | 2/1957 | Uhrich | 214/314 |
| 2,872,058 | 2/1959 | Doepke et al. | 214/314 |
| 3,011,666 | 12/1961 | Dempster et al. | 414/414 X |
| 3,089,725 | 5/1963 | Bertels | 414/419 X |
| 3,306,479 | 2/1967 | Hopfield | 414/414 |
| 3,978,999 | 9/1976 | Ryder | 214/314 |
| 4,269,559 | 5/1981 | Focke | 414/414 |
| 4,744,715 | 5/1988 | Kawabata | 414/419 X |

FOREIGN PATENT DOCUMENTS

| | | |
|---|---|---|
| 0145461 | 12/1980 | Fed. Rep. of Germany . |
| 2079123 | 4/1987 | Japan . |
| 2079124 | 4/1987 | Japan . |

Primary Examiner—Robert J. Spar
Assistant Examiner—John VandenBosche

[57] ABSTRACT

A nuclear fuel pellet unloading apparatus includes a transfer housing pivotally movable between an upright position remote from a pellet deposit site and an inverted position adjacent to the deposit site, and convertible between opened and closed conditions. In its upright position and closed condition, the housing receives a sintering boat loaded with nuclear fuel pellets and holds the boat while retaining the pellets within the boat as the boat is moved from upright to inverted orientations upon pivoting of the housing from its upright to inverted position. An actuator is operated for causing pivoting of the housing from its upright to inverted position and back to its upright position. A latch member latches the housing in its closed condition when the housing is disposed in its upright position and as the housing is pivoted from its upright position toward its inverted position. A release member actuates the latch member as the housing reaches its inverted position to unlatch the housing and render it capable thereafter of converting from closed to opened condition upon reverse pivoting of the housing from the inverted position back toward the upright position by operating the actuator, thereby allowing dispensing of pellets from the opened housing and open top of the boat to the pellets deposit site.

20 Claims, 4 Drawing Sheets

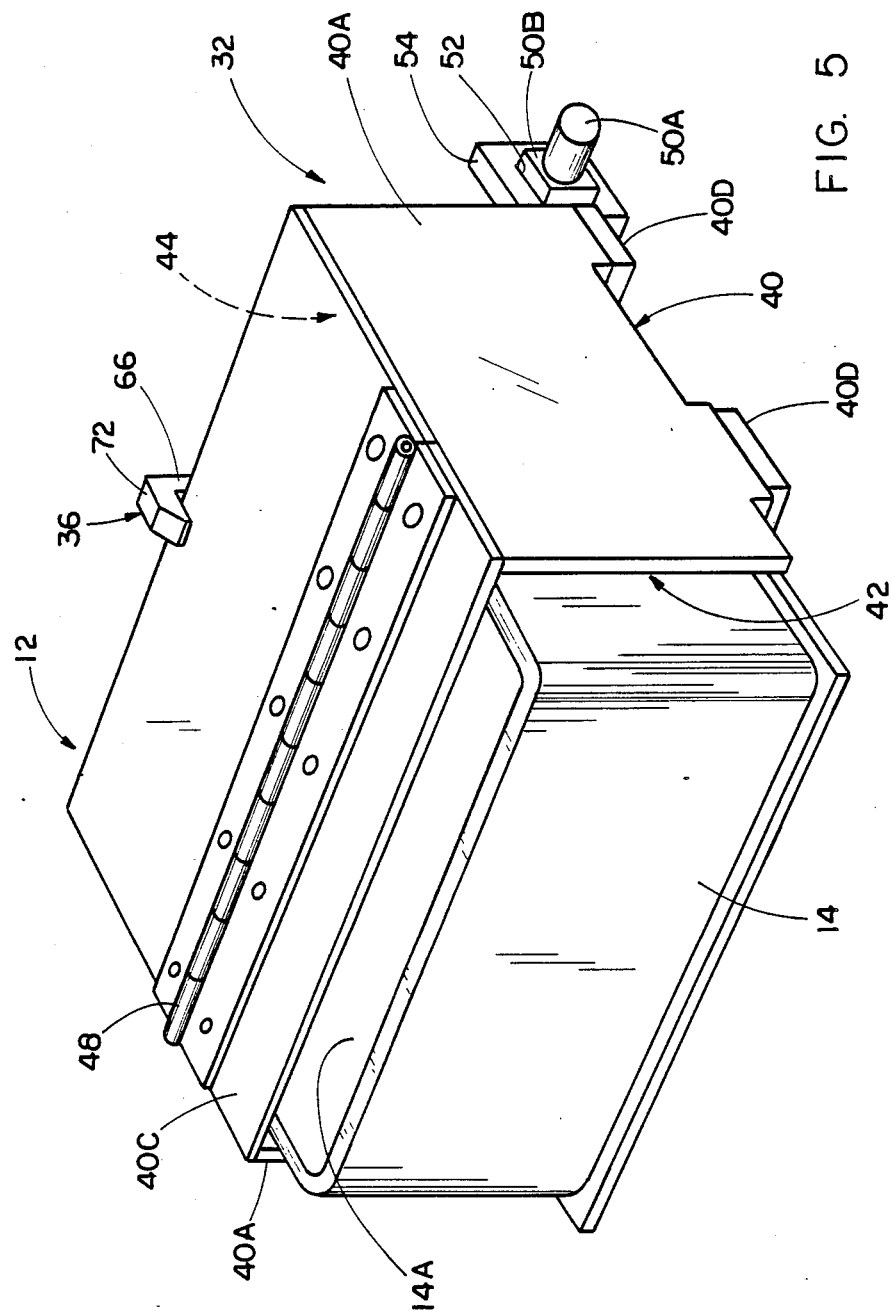

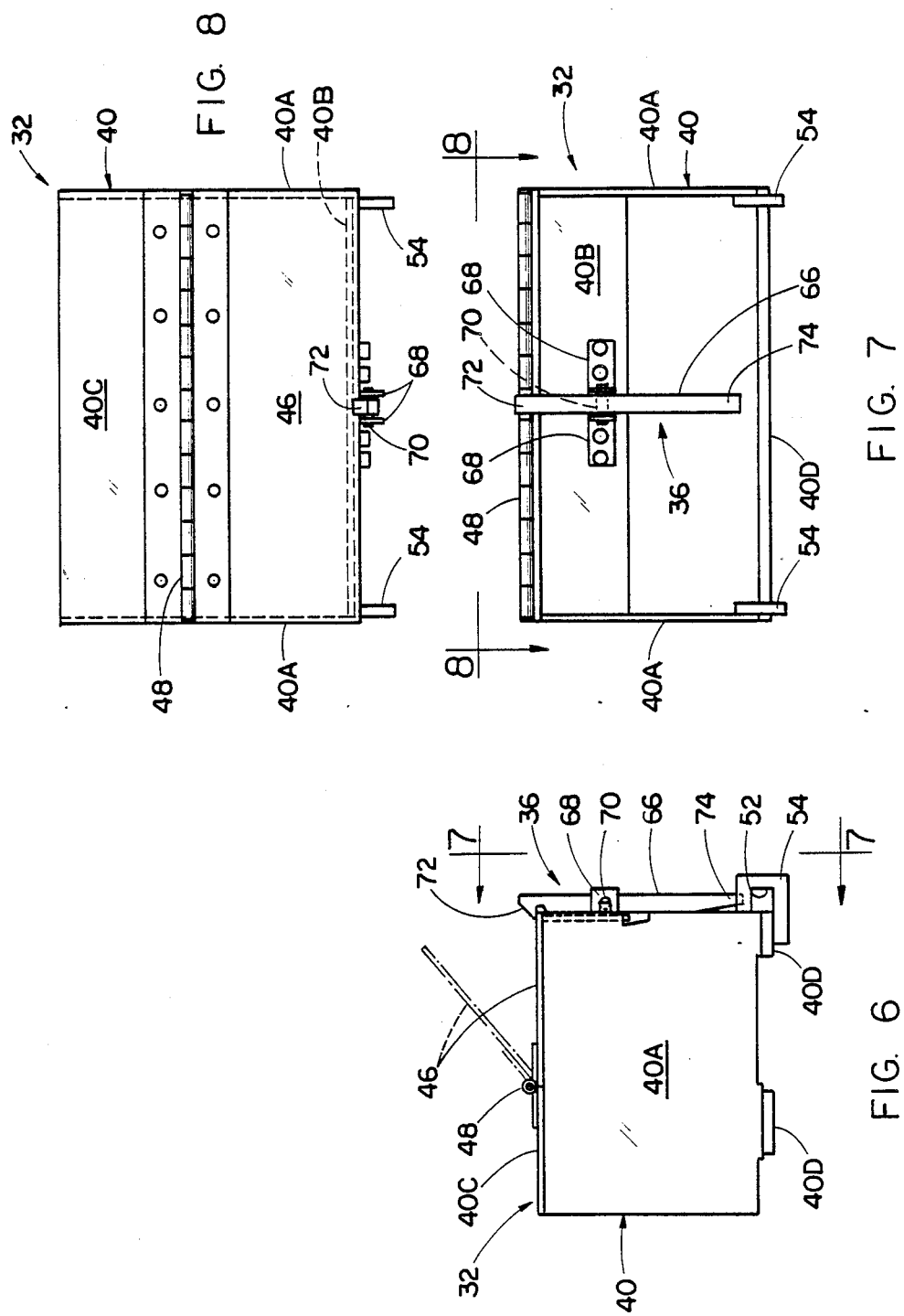

NUCLEAR FUEL PELLET SINTERING BOAT UNLOADING APPARATUS AND METHOD

BACKGROUND OF THE INVENTION

1. Field of the Invention

The present invention relates generally to handling of nuclear fuel pellets and, more particularly, is concerned with an apparatus and method for unloading pellets from a sintering boat into a pellet transfer pan.

2. Description of the Prior Art

Conventional practice in fabrication of nuclear fuel pellets requires transfer of pellets from station to station in the manufacturing process. Heretofore, transfer between certain stations has been performed manually. For instance, pellets are typically sintered in a furnace while stacked in large numbers in a boat, a square-shaped molybdenum container with an open top. Following the sintering station, the pellets must be unloaded from the boat into a tray or pan for transport to another pellet processing station, such as a grinding station.

Since the pellets are hard, abrasive and subject to chipping on impact and since the molybdenum boat becomes brittle with continued service, it has been common practice to manually unload the boat by inverting it over the pan. Such procedure increases the exposure of personnel to the radioactivity of the pellets, airborne particles, and high temperature of the sintering boat, so that elaborate protective safeguards must be taken. Also, with the large number of pellets being contained in a single sintering boat, the risk of chipping and otherwise damaging the valuable pellets is substantially increased.

One automated approach to unloading pellets from a sintering boat is disclosed in U.S. Pat. No. 4,642,016 to Bucher et al, assigned to the assignee of the present invention. In the Bucher et al patent, an unloading apparatus is disclosed which includes a boat clamping and inverting mechanism for carrying out a controlled, gradual tilting or pivoting of the loaded sintering boat, and a pellet transfer shroud defining a transfer surface adjacent the boat as it is tilted or pivoted through an arcuate path from an upright position to an inverted position along the transfer surface. The transfer surface is spaced from the boat path just enough to allow individual pellets, upon sliding through the open top of the boat as the boat pivots from its upright to inverted position, to slide down the transfer surface past the boat and on to the next station.

However, the approach of the above-cited patent is not particularly applicable to depositing pellets from the boat directly in a stationary transfer pan. Consequently, a need still exists for an alternative approach to unloading pellets from the sintering boat directly into the transfer pan. The technique must not only carefully handle the pellets to avoid chipping thereof, but must also gently handle the expensive, and oftentimes brittle, molybdenum sintering boat.

SUMMARY OF THE INVENTION

The present invention provides a nuclear fuel pellet sintering boat unloading apparatus and method designed to satisfy the aforementioned needs. The present invention provides an approach to transferring sintered pellets in a gentle, controlled manner from a hot sintering boat into a stainless steel transfer pan with minimum damage to the pellets. The operator is not required to handle the hot sintering boat. Instead, a transfer housing is provided to accept the sintering boat and to be actuated remotely by the operator for inverting the boat and emptying its load of pellets into the transfer pan.

Accordingly, the present invention is directed to an apparatus for unloading nuclear fuel pellets from a sintering boat having an open top. The unloading apparatus comprises: (a) a transfer housing mounted for pivotal movement between an upright position remote from a pellet deposit site to an inverted position adjacent to the deposit site and being convertable between opened and closed conditions, the housing in its upright position and closed condition capable of receiving a sintering boat loaded with nuclear fuel pellets and of holding the boat and retaining the pellets within the boat as the boat is moved from an upright to inverted orientation upon pivoting of the housing from its upright to inverted position; (b) an actuator operable for causing pivoting of the housing from its upright to inverted position and back to its upright position; (c) a latch member for latching the housing in its closed condition when housing is disposed in its upright position and as the housing is pivoted from its upright position toward its inverted position; and (d) a release member for actuating the latch member as the housing reaches its inverted position to unlatch the housing such that the housing is thereafter capable of converting from its closed to opened condition upon reverse pivoting of the housing from its inverted position back toward its upright position by operation of the actuator thereby allowing dispensing of pellets from the opened housing and open top of the boat to the pellet deposit site.

Further, the transfer housing when in its upright position is at a first elevation and when in its inverted position is at a second elevation lower than the first elevation. Also, the transfer housing includes a body and a lid movably mounted on the body for converting the housing between its opened and closed conditions. The pellets slide out the open top of the inverted boat and down the housing lid to the pellet deposit site upon reverse pivoting of the opened housing.

The present invention is also directed to a method for unloading nuclear fuel pellets from a sintering boat having an open top. The unloading method comprises the steps of: (a) pivoting a transfer housing loaded with the boat filled with nuclear fuel pellets about a generally horizontal axis from an upright position remote from a pellet deposit site to an inverted position adjacent to the deposit site to move the boat from an upright to inverted orientation with the pellets retained within the boat by a latched lid on the housing; (b) unlatching the lid of the housing as the housing reaches its inverted position; and (c) reverse pivoting the housing from its inverted position back toward its upright position to permit the unlatched lid to pivot from a closed to opened condition thereby allowing pellets to slide out of the open top of the inverted boat and down the opened lid of the housing to the deposit site.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is an enlarged perspective view of a transfer housing of the unloading apparatus holding the sintering boat from which nuclear fuel pellets are unloaded.

FIG. 6 is a side elevational view of the transfer housing of FIG. 5.

FIG. 7 is an end elevational view of the transfer housing as seen along line 7—7 of FIG. 6

FIG. 8 is a top plan view of the transfer housing as seen along 8—8 of FIG. 7.

DETAILED DESCRIPTION OF THE INVENTION

Figure 1:
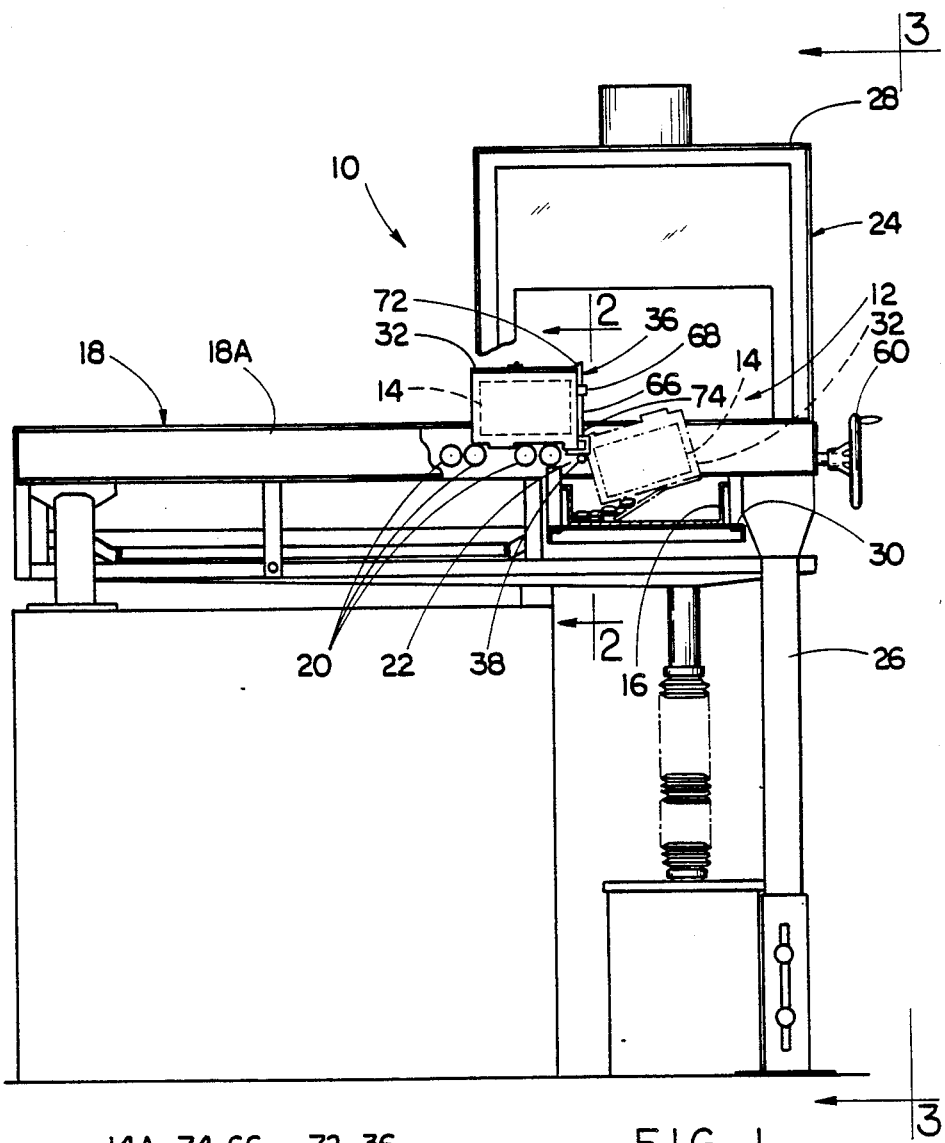
FIG. 1 is a side elevational view of a sintering furnace exit station incorporating a sintering boat unloading apparatus in accordance with the present invention, illustrating upright and inverted positions of the boat.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1-4, there is illustrated a sintering furnace exit station, generally designated 10, employing an unloading apparatus 12 of the present invention for unloading nuclear fuel pellets from a sintering boat 14 into a transfer pan 16. The furnace exit station 10 includes a boat discharge track 18 mounting spaced rollers 20 for advancing a boat 14 filled with sintered pellets from the sintering furnace to an end terminal 22 of the track 18 where the pellets will be dumped from the boat 14 through the open top 14A thereof into the pan 16 using the unloading apparatus 12. Pellet dumping takes place inside of a compartment 24 composed of a support structure 26 covered by a hood 28. The support structure 26 defines the end terminal 22 receiving the upright boat at a higher elevation than that of a pellet deposit site 30 supporting the transfer pan 16 and underlying the boat 14 after being inverted by the unloading apparatus 12, as seen in FIG. 1.

In its basic components, the unloading apparatus 12 includes a transfer housing 32, an actuator 34, a latch member 36 and a release member 38. As best seen in FIGS. 5-8, the transfer housing 32 of the unloading apparatus 12 when in its upright boat-loading position is located at the terminal end 22 of the boat discharge track 18. The transfer housing 32 includes a rectangular box-shaped body 40 formed by a plurality of interconnected side, front, top and bottom wall portions 40A-40D. The bottom wall portions 40D of the body 40 are spaced apart allowing the body to be placed astraddle a pair of the rollers 20, as seen in FIG. 1. The rear of the housing body 40 is open at 42 for receiving therethrough a sintering boat 14 arriving at the terminal end 22 of the track 18 from the sintering furnace. The top wall portion 40C of the housing body 40 closes approximately the rear half of the body and defines an open top portion 44 at the front half thereof. The transfer housing 32 also includes a lid 46 pivotally mounted by a hinge 48 at its rear edge to the front edge of the top wall portion 40C for movable between opened and closed conditions, as respectively shown in dashed and solid line forms in FIG. 6.

Figure 2:
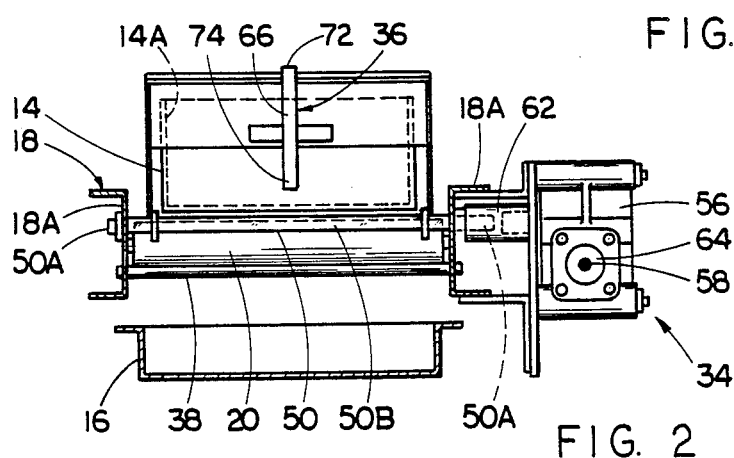
FIG. 2 is an enlarged fragmentary end elevational view, partly sectioned, of the unloading apparatus as seen along line 2—2 of FIG. 1.
Figure 3:
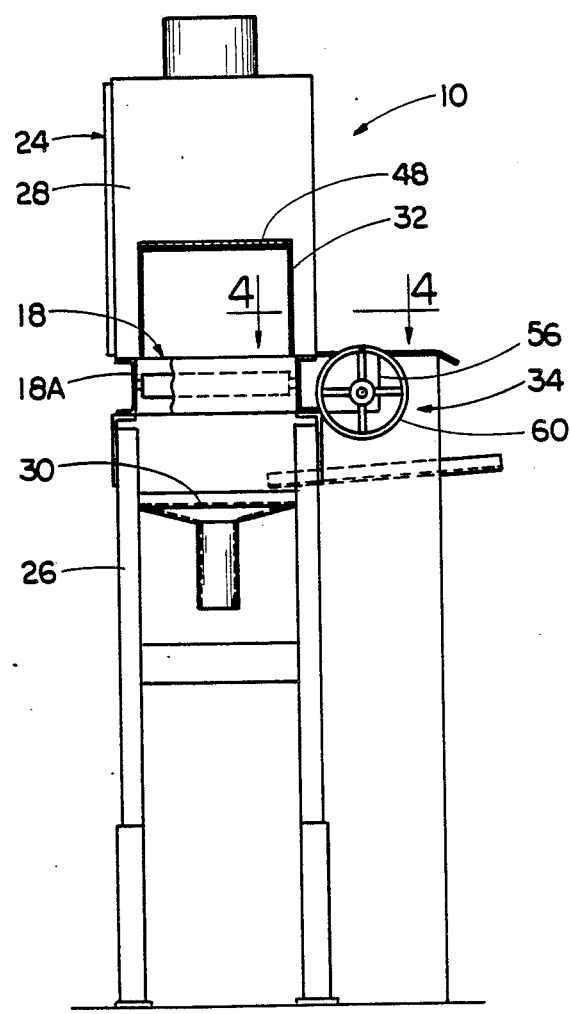
FIG. 3 is an end elevational view of the sintering furnace exit station as seen along line 3—3 of FIG. 1.
Figure 4:
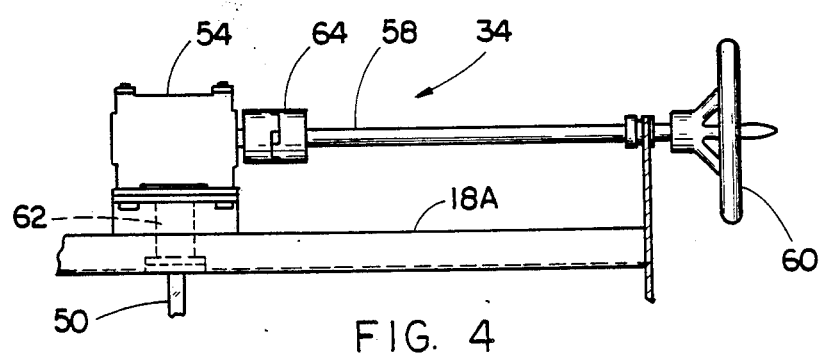
FIG. 4 is an enlarged fragmentary top plan view of the unloading apparatus as seen along line 4—4 of FIG. 3.

As seen in FIGS. 2-4, the actuator 34 of the unloading apparatus 12 is mounted to the support structure 26 of the sintering furnace exit station 10 and coupled to the body 40 of the transfer housing 32. More particularly, the actuator 34 includes an elongated shaft 50 extending between and rotatably-mounted at its opposite ends 50A by the spaced parallel rails 18A of the track 18 at the edge of the terminal end 22 thereof. The shaft 50 at least has spaced axial portions 50B of rectangular shape in cross-section configured to fit through rectangular shaped slots 52 defined through pair of spaced elements 54 attached to the housing body 40 adjacent a lower front corner edge thereof for coupling the shaft 50 to the housing body 40 so as to cause pivoting of the housing 32, as seen in FIG. 1, upon rotation of the shaft 50.

The actuator 34 further includes a rotary motion transmitting means in the form of a reduction gear 56 and another elongated shaft 58 and a wheel-type handle 60. The reduction gear 56 is mounted to one of the track rails 18A and connected by couplers 62, 64 to the respective shafts 50, 58. Rotation of the handle 60 in one direction causes rotation of the shaft 58 and the shaft 50 via the gear 56 for causing pivoting of the housing 32 from its upright to inverted position, whereas rotation of the handle 60 in an opposite direction causes opposite rotation of the shafts 58, 50 for causing pivoting of the housing 32 from its inverted position back to upright position. It is seen, therefore, that the actuator 34 is coupled to the housing body 40 and is used for producing pivoting of the housing 32 about the generally horizontal axis defined by the shaft 40 from the upright to inverted position and back to the upright position and therewith pivoting of the boat 14 from an upright to inverted orientation and back to the upright orientation.

Referring to FIGS. 1 and 5-8, the latch member 36 of the unloading apparatus 12 is shown pivotally coupled to the front wall portion 40B of the housing body 40. Preferably, the latch member 36 is an elongated arm 66 pivotally mounted by a pair of spaced brackets 68 and a pin 70 received through the brackets 68 and through an intermediate portion of the arm 66 located between its opposite ends. One of the ends of the arm 66 is a hook portion 72 which extends upwardly slightly above the housing 32 for engaging the front edge of the housing lid 46 when the latter is pivoted closed to latch the housing 32 in the closed condition. Due to pivotal mounting of the latch arm 66 being located closer to the upper end of the latch arm than its lower end, the hook portion 72 will tend to assume the position of FIG. 6 latching the housing lid 46 in the closed condition upon pivoting of the housing body 40 from the inverted position back to the upright position. Thus, when the housing body 40 is disposed in the upright position and as it is pivoted toward the inverted position, the housing lid 46 will be maintained in the closed condition. For this reason, even though the sintering boat 14 has an open top 14A, the closed housing body 40 and lid 46 will hold the boat 14 and retain the pellets within the boat as the boat is moved from its upright orientation to an inverted orientation upon pivoting of the housing 32 from its upright to inverted position.

As seen in FIGS. 1–3, the release member 38 of the unloading apparatus 12 is in the form of an elongated bar 38 stationarily mounted adjacent to and above the pellet deposit site 30 supporting the transfer pan 16. The release bar 38 is disposed adjacent the housing body 40 when the housing 32 arrives at its inverted position (after pivoting through approximately 170 degrees) such that the bar 38 engages the lower end 74 of the latch arm 66 causing pivoting of the arm 66 and movement of its hook portion 72 away from the front edge of the lid 46 and thereby unlatching of the lid and the housing from the closed condition. The unlatched lid 46 opens only slightly before it contacts the bottom of the pan 16.

However, the lid 46 pivots from its closed condition toward its opened condition upon reverse pivoting of the housing body 40 from its inverted position back toward its upright position by reverse rotation of the actuator handle 60. As the lid 46 opens, the pellets are permitted to slide out the open top 14A of the inverted boat 14 and down the inclined opened lid 46 of the housing 32 into the pan 16 at the pellet deposit site 30 in a gentle controlled manner. As explained earlier, the latch member 36 automatically latches the housing lid to the closed condition as the housing 32 reaches its upright position upon completion of reverse pivoting of the housing 32.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In combination with a support structure defining a pellet deposit site and a sintering boat terminal site with said terminal site being offset upstream from and at a higher elevation than said deposit site, an apparatus for unloading nuclear fuel pellets from a sintering boat having an open top, said apparatus comprising:
    (a) a transfer housing including a body with a lid movable between opened and closed conditions, said housing body being mounted to said support structure for pivotal movement between an upright position at said terminal site remote from said deposit site and an inverted position remote from said terminal site and adjacent to said deposit site, said housing body when in its upright position with said lid in said closed condition being capable of receiving a sintering boat loaded with nuclear fuel pellets and of holding the boat in an upright orientation, said housing body with said lid in said closed condition further being capable of holding the boat and retaining the pellets within the boat as the boat is moved from its upright orientation to an inverted orientation upon pivoting of said housing body from its upright to inverted position;
    (b) an actuator supported by said support structure and coupled to said housing body and being operable for causing pivoting of said housing body from its upright to inverted position and back to its upright position;
    (c) a latch member coupled to said housing body and normally disposed in a first position for latching said housing lid in said closed condition when said housing body is disposed in its upright position and maintaining said housing lid in said closed condition as the housing body is pivoted from its upright position toward its inverted position; and
    (d) a release means mounted on said support structure adjacent said housing body for actuating said latch member and causing movement thereof to a second position for unlatching said housing lid as said housing body reaches its inverted position adjacent to said deposit site thereby permitting said lid to engage said deposit site and remain in said closed position, said unlatched housing lid thereafter being capable of moving from said closed condition to said opened condition upon reverse pivoting of said housing body from its inverted position back toward its upright position thereby allowing pellets to slide out said opened housing and open top of the inverted boat and down said opened lid of said housing to said deposit site.

2. The apparatus as recited in claim 1, wherein said transfer housing is mounted for pivotal movement about a generally horizontal axis.

3. The apparatus as recited in claim 1, wherein said actuator includes:
    a shaft rotatably mounted to said support structure and coupled to said transfer housing body for causing pivoting of said housing body between its upright and inverted positions upon rotation of said shaft;
    a rotary motion transmitting means coupled to said shaft; and
    a handle connected to said rotary motion transmitting means such that rotation of said handle in one direction causes rotation of said shaft via said rotary motion transmitting means for causing pivoting of said housing body from its upright to inverted position, whereas rotation of said handle in an opposite direction causes opposite rotation of said shaft via said rotary motion transmitting means for causing pivoting of said housing body from its inverted to upright position.

4. The apparatus as recited in claim 3, wherein said rotary motion transmitting means is a gear reducing mechanism.

5. The apparatus as recited in claim 3, wherein:
    said housing body has a pair of spaced elements at a corner thereof defining a pair of slots of rectangular shape; and
    said shaft has spaced axial portions of rectangular shape in cross-section configured to fit through said rectangular slots for coupling said shaft to said housing body so as to cause pivoting of said housing body upon rotation of said shaft.

6. The apparatus as recited in claim 1, wherein said latch member includes an elongated arm pivotally mounted intermediate between its opposite ends to said housing body, one of said ends of said latch member having a hook portion for engaging said housing lid to place said lid in said closed condition, the opposite of said ends of said latch member being engagable by said release means as said housing body reaches its inverted position for causing pivoting of said arm and disengaging of said hook portion from said housing lid to unlatch said lid from said closed condition.

7. The apparatus as recited in claim 6, wherein said release means is an elongated bar stationarily mounted adjacent the pellet deposit site.

8. In combination with a support structure defining a pellet deposit site and a sintering boat terminal site with said terminal site being offset upstream from and at a higher elevation than said deposit site, an apparatus for unloading nuclear fuel pellets from a sintering boat having an open top, said apparatus comprising:

(a) a transfer housing including a body with a lid pivotable between opened and closed conditions, said housing body being mounted to said support structure about a generally horizontal axis for pivotal movement between an upright position at said terminal site remote from said deposit site and an inverted position remote from said terminal site and adjacent to said deposit site, said housing body when in said upright position with said lid in said closed condition being capable of receiving a sintering boat disposed in an upright orientation, loaded with nuclear fuel pellets and having an open top, said housing body also being capable of holding the boat and retaining the pellets within the boat as the boat is moved from its upright orientation to an inverted orientation upon pivoting of said housing body from its upright to inverted position;

(b) first means supported by said support structure and coupled to said housing body and being operable for causing pivoting of said housing body from its upright to inverted position and back to its upright position;

(c) second means coupled to said housing body and normally disposed in a first position for latching said lid of said housing in said closed condition when said housing body is disposed in said upright position and maintaining said housing lid in said closed condition as the housing body is pivoted from its upright position toward its inverted position; and (d) third means mounted to said support structure adjacent to said housing body for engaging said second means and causing movement thereof to a second position for unlatching said lid of said housing as said housing body reaches its inverted position adjacent to said deposit site thereby permitting said lid to engage said deposit site and remain in said closed condition, said unlatched lid thereafter capable of pivoting from its closed to opened condition upon reverse pivoting of said housing body from its inverted position back toward its upright position thereby allowing pellets to slide out the open top of the inverted boat and down said opened lid of said housing to said deposit site.

9. The apparatus as recited in claim 8, wherein said first means includes:

a shaft rotatably mounted to said support structure and coupled to said transfer housing body for causing pivoting of said housing body between its upright and inverted positions upon rotation of said shaft;

a rotary motion transmitting means coupled to said shaft; and a handle connected to said rotary motion transmitting means such that rotation of said handle in one direction causes rotation of said shaft via said rotary motion transmitting means for causing pivoting of said housing body from its upright to inverted position, whereas rotation of said handle in an opposite direction causes opposite rotation of said shaft via said rotary motion transmitting means for causing pivoting of said housing body from its inverted to upright position.

10. The apparatus as recited in claim 9, wherein said rotary motion transmitting means is a gear reducing mechanism.

11. The apparatus as recited in claim 9, wherein:

said housing body has a pair of spaced elements at a corner thereof defining a pair of slots of rectangular shape; and said shaft has spaced axial portions of rectangular shape in cross-section configured to fit through said rectangular slots for coupling said shaft to said housing body so as to cause pivoting of said housing body upon rotation of said shaft.

12. The apparatus as recited in claim 8, wherein said second means includes an elongated arm pivotally mounted intermediate between its opposite ends to said housing body, one of said ends of said second means having a hook portion for engaging said housing lid to place said lid in said closed condition, the opposite of said ends of said second means being engagable by said third means as said housing body reaches its inverted position for causing pivoting of said arm and disengaging of said hook portion from said housing lid to unlatch said lid from said closed condition.

13. The apparatus as recited in claim 8, wherein said third means is an elongated bar stationarily mounted adjacent the pellet deposit site.

14. A method for unloading nuclear fuel pellets from a sintering boat having an open top, said method comprising the steps of:

(a) pivoting a transfer housing loaded with the boat filled with nuclear fuel pellets about a generally horizontal axis from an upright position remote from a pellet deposit surface to an inverted position adjacent to the deposit surface to move the boat from an upright to inverted orientation with the pellets retained within the boat by a latched lid in a closed condition on the housing;

(b) unlatching the lid of the housing as the housing reaches its inverted position but engaging the unlatched lid with the deposit surface to retain it in its closed condition; and (c) reverse pivoting the housing from its inverted position back toward its upright position to permit the unlatched lid to pivot from the closed condition to an opened condition thereby allowing pellets to slide out of the open top of the inverted boat and down the opened lid of the housing to the deposit site.

15. The method as recited in claim 14, further comprising the step of:

loading the boat when full into and unloading the boat when empty from the housing with the boat disposed in the upright orientation and the housing disposed at the upright position and with the lid latched in the closed condition on the housing.

16. The method as recited in claim 14, wherein said pivoting moves the housing from the upright position at a first elevation to the inverted position at a second elevation being lower than the first elevation.

17. The method as recited in claim 14, further comprising:

latching the lid of the housing in the closed condition when the housing is disposed in its upright position and maintaining the housing lid in the closed condition as the housing is pivoted from its upright position toward its inverted position.

18. The method as recited in claim 17, wherein said latching of the lid of the housing in the closed condition occurs as the housing reaches its upright position upon completion of said reverse pivoting of the housing.

19. A method for unloading nuclear fuel pellets from a sintering boat having an open top, said method comprising the steps of:
   (a) loading a sintering boat with an open top and in an upright orientation containing nuclear fuel pellets into a transfer housing disposed at an upright position and having a lid pivotable between opened and closed conditions;
   (b) pivoting the housing loaded with the boat about a generally horizontal axis from the upright position at a first elevation remote from a pellet deposit surface to an inverted position at a second elevation lower than the first elevation with the lid in the closed condition for placing the closed lid adjacent to and engaged with the pellet deposit surface and for moving the boat from its upright orientation to an inverted orientation with the pellets retained within the boat by the closed lid of the housing;
   (c) latching the lid of the housing in the closed condition when the housing is disposed in its upright position and maintaining the housing lid in the closed condition as the housing is pivoted from its upright position toward its inverted position;
   (d) unlatching the closed lid of the housing as the housing reaches its inverted position and the closed lid engages and is retained in a closed position the deposit surface; and
   (e) reverse pivoting the housing from its inverted position back toward its upright position such that the unlatched but closed lid is permitted to pivot from its closed to opened condition thereby allowing pellets to slide out the open top of the inverted boat and down the opened lid of the housing to the deposit site.

20. The method as recited in claim 19, further comprising:
   latching the lid of the housing to said closed condition as the housing reaches its upright position upon completion of said reverse pivoting of said housing.

* * * * *